US006989535B2

(12) United States Patent
Tani et al.

(10) Patent No.: US 6,989,535 B2
(45) Date of Patent: Jan. 24, 2006

(54) ATOMIC FORCE MICROSCOPY, METHOD OF MEASURING SURFACE CONFIGURATION USING THE SAME, AND METHOD OF PRODUCING MAGNETIC RECORDING MEDIUM

(75) Inventors: Hiroshi Tani, Naka-gun (JP); Yoko Ogawa, Odawara (JP); Masanori Inoue, Odawara (JP); Takaaki Shirakura, Chigasaki (JP); Koji Sonoda, Naka-gun (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 10/309,278

(22) Filed: Dec. 4, 2002

(65) Prior Publication Data

US 2003/0150990 A1   Aug. 14, 2003

Related U.S. Application Data

(62) Division of application No. 09/444,283, filed on Nov. 19, 1999, now abandoned.

(30) Foreign Application Priority Data

Nov. 20, 1998 (JP) .............................. 10-330564

(51) Int. Cl.
*G01N 23/00* (2006.01)

(52) U.S. Cl. ...................... 250/306; 250/307; 250/305; 427/127; 427/387

(58) Field of Classification Search ................ 427/127, 427/387; 73/105; 250/306, 307, 305
See application file for complete search history.

(56) References Cited

U.S. PATENT DOCUMENTS

| 4,835,070 | A | * | 5/1989 | Kurokawa et al. | .......... 428/65.5 |
|---|---|---|---|---|---|
| 5,193,383 | A | | 3/1993 | Burnham et al. | .............. 73/105 |
| 5,425,988 | A | * | 6/1995 | Ogawa et al. | ............... 428/333 |
| 5,602,330 | A | | 2/1997 | Chamberlin et al. | ........... 73/105 |
| 5,753,814 | A | | 5/1998 | Han et al. | ...................... 73/105 |
| 5,843,561 | A | * | 12/1998 | Uwazumi et al. | ............ 428/141 |
| 5,914,151 | A | * | 6/1999 | Usuki | .......................... 427/128 |
| 6,033,738 | A | | 3/2000 | Teranishi et al. | ............ 427/387 |
| 6,071,609 | A | * | 6/2000 | Furutani et al. | ............. 428/332 |
| 6,249,403 | B1 | * | 6/2001 | Tokisue et al. | ........... 360/235.2 |
| 6,249,503 | B1 | * | 6/2001 | Aratani | ....................... 369/126 |

FOREIGN PATENT DOCUMENTS

JP          A 4-12547          1/1992

(Continued)

OTHER PUBLICATIONS

Journal of Japanese Society of Tribologists, vol. 42, No. 4, 1997, p. 251-256 including an English translation thereof.

*Primary Examiner*—Nikita Wells
*Assistant Examiner*—Anthony Quash
(74) *Attorney, Agent, or Firm*—Kenyon & Kenyon

(57) ABSTRACT

To provide an atomic force microscopy which allows the measurement of the configuration of a surface being measured by using the phenomenon observed between the surface being measured and a probe approaching thereto at very fine distance.

By selecting the material of the tip surface of said probe such that the surface energy of said probe tip becomes less than the interface energy between the tip surface and the surface being measured, thereby the surface configuration of soft body, or soft fouling adhered to the body surface can be measured.

A method of measuring the surface configuration and a method of producing magnetic recording medium using the same are also provided.

13 Claims, 7 Drawing Sheets

FOREIGN PATENT DOCUMENTS

| | | |
|---|---|---|
| JP | 5-164514 | 6/1993 |
| JP | 6-088723 | 3/1994 |
| JP | A 6-264217 | 9/1994 |
| JP | A 6-267109 | 9/1994 |
| JP | A 7-121916 | 5/1995 |
| JP | A 7-130013 | 5/1995 |
| JP | 7-192255 | 7/1995 |
| JP | A 7-192255 | 7/1995 |
| JP | 7-325090 | 12/1995 |
| JP | 2500373 | 3/1996 |
| JP | 8-193341 | 7/1996 |
| JP | 10-90287 | 4/1998 |

* cited by examiner

ATOMIC FORCE MICROSCOPY, METHOD OF MEASURING SURFACE CONFIGURATION USING THE SAME, AND METHOD OF PRODUCING MAGNETIC RECORDING MEDIUM

This is a division of application Ser. No. 09/444,283 filed Nov. 19, 1999, now abandoned.

BACKGROUND OF THE INVENTION

1. Field of the Invention

The present invention relates to an atomic force microscopy for measuring the configuration of a surface using extreme weak atomic force affecting between surface atoms and approaching probe atoms, a method of measuring surface configuration by using the microscopy, and to a method of producing magnetic recording medium.

2. Description of the Related Art

Recently, atomic force microscopy (often referred to as AFM) is commercially available which can observe very fine surface configuration with high fidelity. The principle of such microscopy is to observe the surface configuration at atomic size by detecting very weak atomic force affecting between the atoms on the surface with the approaching atoms of a probe to position the height (Z-axis position) of the probe to a predetermined value, in order to plot the Z-axis position at each location when scanning on an X-Y-axis micro-motion stage, as disclosed in for example Japanese Patent Laid-Open No. Hei 5-164514, Japanese Patent Laid-Open No. Hei 6-88723, and Japanese Patent Laid-Open No. Hei 7-325090.

The probe for the atomic force microscopy in the Related Art was made in general of such material as silicone, as described in, for example, Japanese Patent Laid-Open No. Hei 8-193941, and Japanese Patent Laid-Open No. Hei 10-90287.

Magnetic disks in the Related Art, on the other hand, were made by forming non-magnetic base film, magnetic film, protective film on a substrate and depositing thereon liquid lubricant. The liquid lubricant was applied in order to reduce the wear when a magnetic recording head is contacted with the magnetic disk. The wear will be increased if the liquid lubricant film is thinner layer, while on the other hand the magnetic recording head will be adhered if the lubricant film is thick layer to make such troubles as the magnetic disk device will not start up. In Japanese Patent Laid-Open No. Hei 7-192255 a method of producing magnetic disks and a method of evaluating the disks by measuring the average thickness of the lubricant film by FTIR (Fourier Transform Infra-Red spectrophotometry) as well as by measuring the conditions of coating by X-ray photo-electronic spectrometry in order for the lubricant to be coated in dots.

Since the atomic force microscopes in the Related Art as described above has in general large surface energy in the probe. If a trace of soft fouling such as oil is adhered onto the body surface, the soft fouling will adhere to the probe which in turn drags the soft fouling, resulting in a preventing the measuring of the configuration of surface.

In addition, the conventional method of producing a magnetic disk as described above has another problem in that it is difficult to obtain a magnetic disk with the lubricant characteristics well controlled by the measurement in short period of time. It may be thus difficult to sufficiently control the lubricant characteristics by using the measurements, because FTIR measurement measures and evaluates the average thickness of film. The X-ray photoelectronic spectrometry has disadvantages that, because the measurement of specimen is performed in a vacuum environment, the measurement requires time to make the vacuum environment, thus it is difficult to quickly measure the specimen. The X-ray photoelectronic spectrometry measurement has also disadvantages that it may erroneously evaluate the specimen because the dot-pattern distribution of lubricant is assumed to be equivalent and the same thickness of dot-pattern lubricant in every location. More specifically, in the state-of-the-art magnetic disks the flying height of the magnetic recording heads over the surface has been gradually decreased to about 25 nm due to the rushed increase of recording density of recent years. Thus there are needs for observing the conditions of fine lubricant film of less than 10 nm adhered onto the surface of magnetic disks, since the conventional method of producing magnetic disks as above lacks the capability to sufficiently follow the recent progress of magnetic disk as describe above.

SUMMARY OF THE INVENTION

Therefore, primary object of the present invention is to provide an atomic force microscopy, which may measure the surface configuration of the soft materials or the surface configuration of the soft fouling, adhered to the surface of substrate.

Another object of the present invention is to provide a method for measuring surface configuration using the atomic force microscopy mentioned in the above object of the present invention.

Still another object of the present invention is to provide a method for producing magnetic disks having a process of measuring the surface configuration of lubricant film applied on the surface of the magnetic disks.

In order to achieve the primary object of the present invention, the atomic force microscope in accordance with the present invention which may measure the surface configuration of the substrate to be measured by using a phenomenon observed between the surface of the body to be measured and a probe approximating thereto at very narrow span, may determine the material of the tip surface of the probe such that the surface energy of the probe tip will become less than the interface energy between the probe tip and the material to be measured.

In addition, in order to achieve the primary object of the present invention, the atomic force microscope in accordance with the present invention which may measure the surface configuration of the body to be measured by using a phenomenon observed between the surface of the body to be measured and a probe approximating thereto at very narrow span, may dispose a film at the tip surface of the probe which is insoluble to solvents and is made of fluoride coating film having fluoroalkyl groups.

In addition, in order to achieve the primary object of the present invention, the atomic force microscope in accordance with the present invention which may measure the surface configuration of the body to be measured by using a phenomenon observed between the surface of the body being measured and a probe approximating thereto at very narrow, microscopic space apart, may have surface energy at the tip surface of the probe less than or equal to $20 \times 10^{-3}$ N/m.

In order to achieve the secondary object above of the present invention, the method for measuring the surface configuration in accordance with the present invention, comprising the steps of approaching a probe to the body surface being measured at the microscopic distance, measuring the atomic force generated between the surface being measured and the approaching probe, and determining the surface configuration of the body being measured, is characterized by determining the material of at least the tip surface of the probe such that the surface energy of the probe tip will become less than the interface energy between the tip and the body being measured.

In addition, in order to achieve the secondary object above of the present invention, the method for measuring the surface configuration in accordance with the present invention, comprising the steps of approaching a probe to the body surface being measured at the microscopic distance, measuring the atomic force generated between the surface being measured and the approaching probe, and determining the surface configuration of the body being measured, is characterized by disposing a film at the tip surface of the probe which is insoluble to solvents and is made of fluoride coating film having fluoroalkyl groups.

In order to achieve the secondary object above of the present invention, the method for measuring the surface configuration in accordance with the present invention, comprising the steps of approaching a probe to the surface being measured at the microscopic distance, measuring the atomic force generated between the surface being measured and the approaching probe, and determining the surface configuration of the body being measured, is characterized by immersing at least the tip of the probe into a solution of fluoride coating material including fluoroalkyl groups, heating then rinsing to form a fluoride coating film thereon.

In either case, the probe tip may be defined as a length in a range from the apex to the maximum surface roughness of the specimen surface being measured. In other words, when the maximum surface roughness of the specimen surface being measured is 20 nm, then the probe tip length is 20 nm from the apex. When at least the probe tip is preliminary dipped into a solution of fluoride coating material including fluoroalkyl groups and heated to form a fluoride coating film thereon, the preferable temperature of heating will be from 100 degrees Celsius to 400 degrees Celsius.

In order to achieve the above mentioned third object, the method of producing magnetic recording medium in accordance with the present invention comprises the steps of forming at least magnetic film on a substrate, forming a lubricant film made of liquid lubricant directly on the magnetic film or with a protective film interposed therebetween, approaching the probe of any of atomic force microscopes as described above in proximity of the lubricant film at the fine microscopic distance, measuring the surface configuration of the lubricant film by measuring the atomic forces generated between the lubricant film surface and the probe, and select among magnetic recording mediums one that the cover rate of the lubricant film calculated from the measured configuration is fallen into a desired range.

Now the function of the present invention will be described. Deposition of soft fouling at the probe tip results in the interface generated between the probe tip material and the soft fouling. When decreasing the surface energy at the probe tip less than the interface energy between this tip and the measured material, no soft fouling will be adhered because energy is lower if surface is maintained than if interface is created. Also no soft fouling will be deposited if the energy is equivalent, because increase of the surface area by the deformation of drops due to the deposition causes increase of the surface energy of liquid drops.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The following description of a preferred embodiment of the present invention may be best understood by reading carefully with reference to the accompanying drawings, in which.

DETAILED DESCRIPTION OF THE PREFERRED EMBODIMENTS

Figure 1:
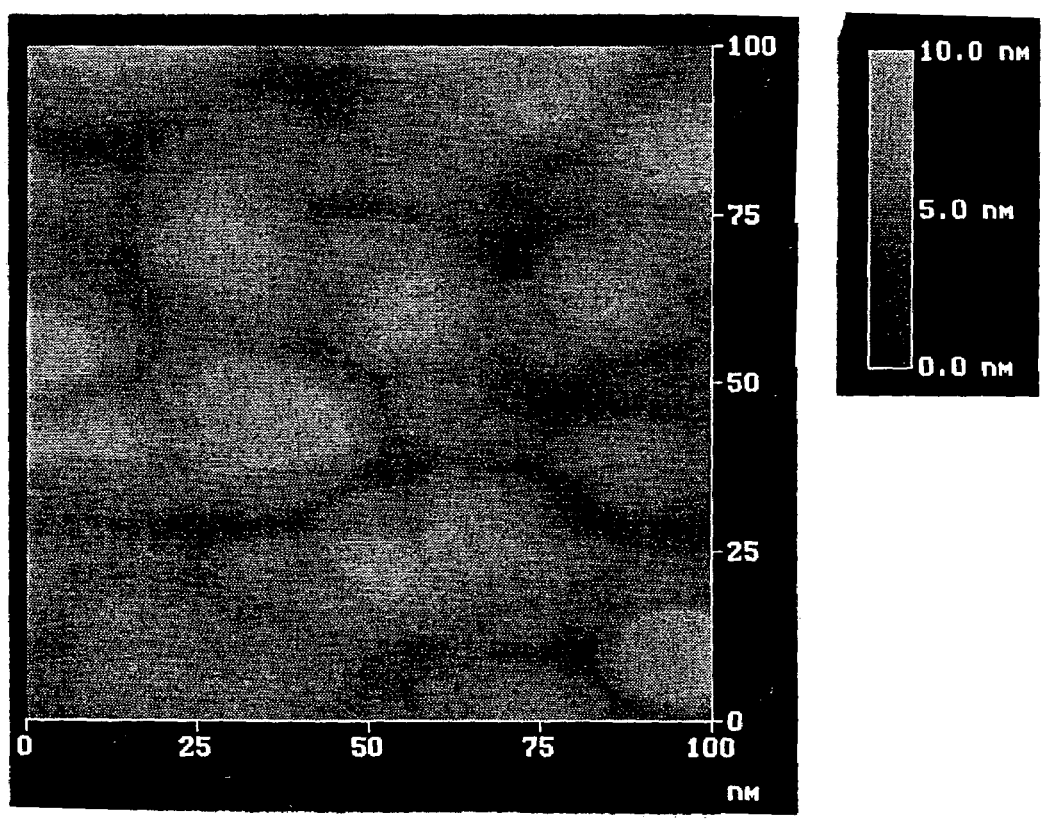
FIG. 1 is an AFM photography of a magnetic disk surface without lubricant, using the probe of comparative example 5.

The preferred embodiments in accordance with the present invention will be now described in detail hereinbelow with reference to the accompanying drawings.

For fluoride coating solution, Fluorad FC722 (registered trade mark; abbreviated as (R) hereinbelow) commercially available from SUMITOMO 3M LIMITED, which is a solution of fluorocompound including fluoroalkyl groups was used by diluting 30 times with the PF5060 (R) (Fluorocarbon solvent) commercially available from SUMITOMO 3M LIMITED. Probes made of single crystal silicone were all immersed into this solution during one (1) minute, then heat processed sixty (60) minutes at 50, 80, 100, and 150 degrees Celsius, or 100 degrees Celsius at ten (10), thirty (30), and sixty (60) minutes, respectively. Thereafter, these specimens were rinsed by immersing one minute into Fluorad FC3255 (R), commercially available from SUMITOMO 3M LIMITED, which is a fluoride solvent. One specimen was further heat processed at 150 degrees Celsius sixty (60) minutes for final heat treatment, after rinse treatment.

Also, specimens were made ,as comparative examples, by doing nothing, by immersing one minute into the fluorinated coating solution without neither heat treatment nor rinse treatment, and by dipping into the solution one minute then rinsing without heat treatment, respectively.

Table 1 below shows these process conditions:

TABLE 1

| | Dipping into coating solution | Temp. of Heat Treatment (degree) | Time of Heat Treatment (min) | Rinse Treatment | Final Heat Treatment |
|---|---|---|---|---|---|
| comparative example 1 | yes | 50 | 60 | no | no |
| comparative example 2 | yes | 80 | 60 | no | no |
| comparative example 3 | yes | 100 | 60 | no | no |
| comparative example 4 | yes | 150 | 60 | no | no |
| embodiment 1 | yes | 50 | 60 | yes | no |
| embodiment 2 | yes | 80 | 60 | yes | no |
| embodiment 3 | yes | 100 | 60 | yes | no |
| embodiment 4 | yes | 150 | 60 | yes | no |
| embodiment 5 | yes | 100 | 10 | yes | no |
| embodiment 6 | yes | 100 | 30 | yes | no |
| embodiment 7 | yes | 100 | 60 | yes | yes |
| comparative example 5 | no | — | — | no | no |
| comparative example 6 | yes | — | — | no | no |
| comparative example 7 | yes | — | — | yes | no |

For the specimens for surface energy measurement, silicone wafers were processed identical to the specimens above. The phase angle was measured after dropping a variety of test drops, then a so-called Gisman plot was created, i.e., the interfacial tension was determined by extrapolation when the contact angle becomes zero (0) degree by creating the interfacial tension of test drops and the contact angle thereof, and the corresponding interfacial tension was given as the surface energy of the material measured.

Magnetic disks were produced by forming a Ni—P plating film on an aluminum alloy substrate, sputterinq a Cr base film, Co—Cr—Ta alloy magnetic film, and carbon protective film thereon and then applying liquid lubricant of perfluoropolyether. The liquid lubricant was applied by dipping into Fomblin Z-DOL (R) at 600 ppm and 1400 ppm, dipping duration three (3) minutes, raising rate one (1) minute. The applied lubricant thickness was determined to be 0.9 nm and 1.8 nm, from the infrared absorbance of C—F bonds by FTIR. For observing the surface, magnetic disk without liquid lubricant applied also was produced.

Figure 9:
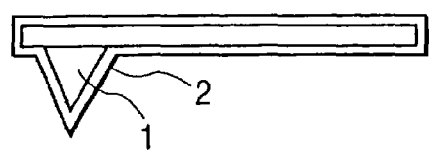
FIG. 9 is a schematic cross-sectional view of a cantilever of a preferred embodiments in accordance with the present invention.

The surface configuration of the magnetic disks as mentioned above was measured by the AFM in accordance with the present invention. The AFM used was D3000 (R) available from Digital Instrumentant Inc., and the cantilever used was NCH-W (R) single crystal silicon cantilever for tapping mode, the measurements were done in the tapping mode. The cantilever has shape shown in FIG. 9. In FIG. 9, the apex of triangle is probe 1, made of single crystal silicon as mentioned above. Although whole surface of the cantilever was coated by fluoride coating film 2 in the embodiment, it will be more preferable to coat the probe tip of the cantilever, for example 30 nm from the apex, or more preferably 50 nm from the apex, for some margin.

Figure 2A:
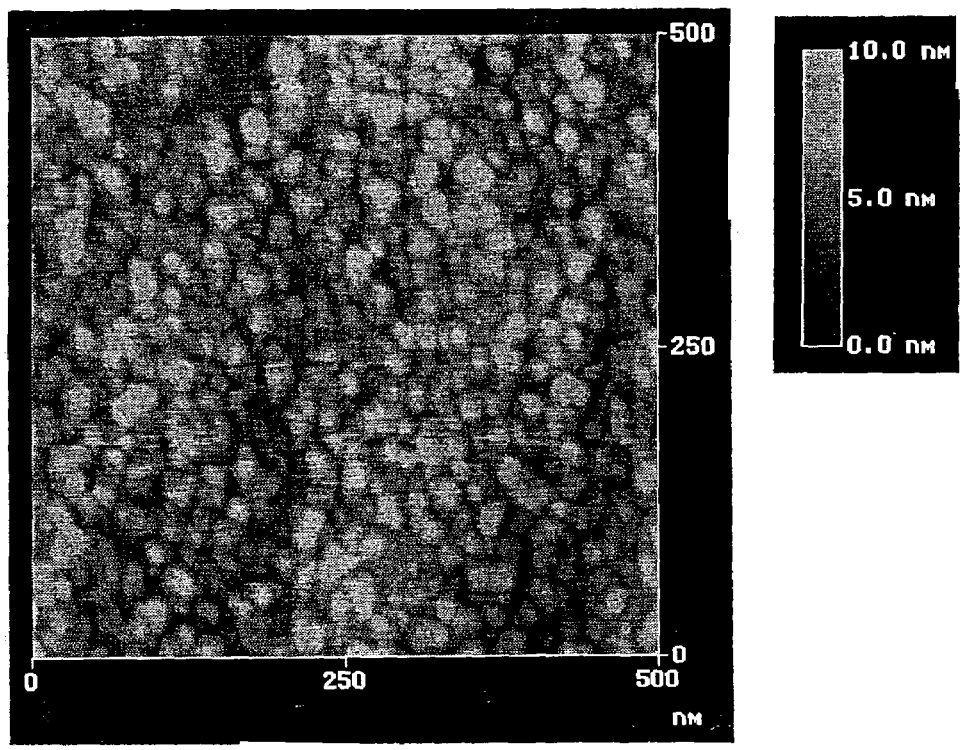
FIG. 2 is an AFM photography of a magnetic disk surface with lubricant, using the probe of comparative example 5.
Figure 2B:
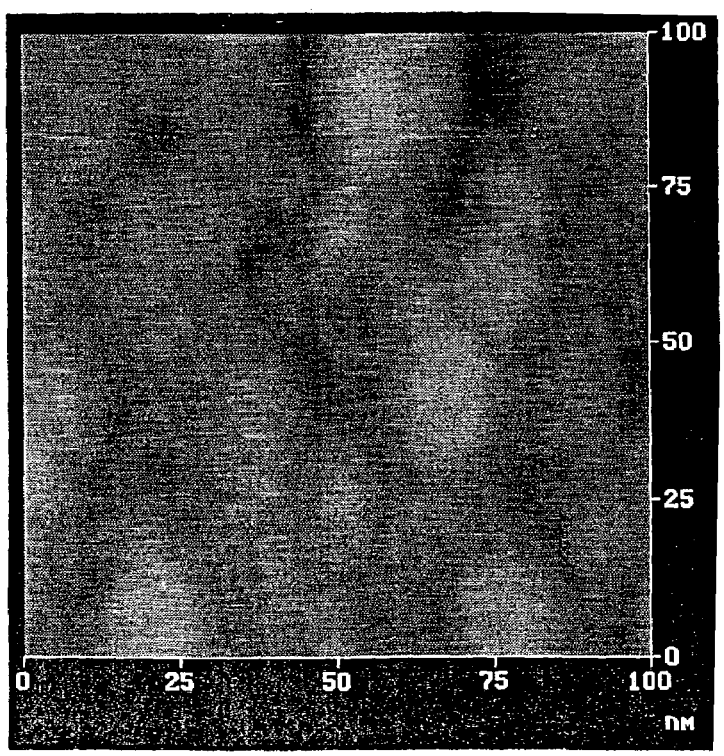

The resulting measurements are shown in FIG. 1 through FIG. 5. FIG. 1 is a microscopic photograph of the surface configuration of the magnetic disk without lubricant applied, by using non-treatment, green probe herein referred to as the comparative example 5, which was the conventional silicon probe. FIG. 2 is a microscopic photograph of the surface configuration of the magnetic disk with lubricant applied, by using the same probe as FIG. 1. The magnetic disk had the lubricant thickness of 0.9 nm. The value in the direction of height is indicated by the brightness of image, Brighter part indicates higher than other part. Surface area shown is 100 nm square for FIG. 1 and FIG. 2(b), and 500 nm square for FIG. 2(a). FIG. 2(b) is a magnification of part of FIG. 2(a). The maximum value of height scale is 10 nm.

In these examples, images of both magnetic disks are not sufficiently sharp. As shown in the drawings, the fine irregularities of the carbon protective film may barely be seen but the configuration of lubricant or surface pollutant may scarcely be identified.

Figure 3A:
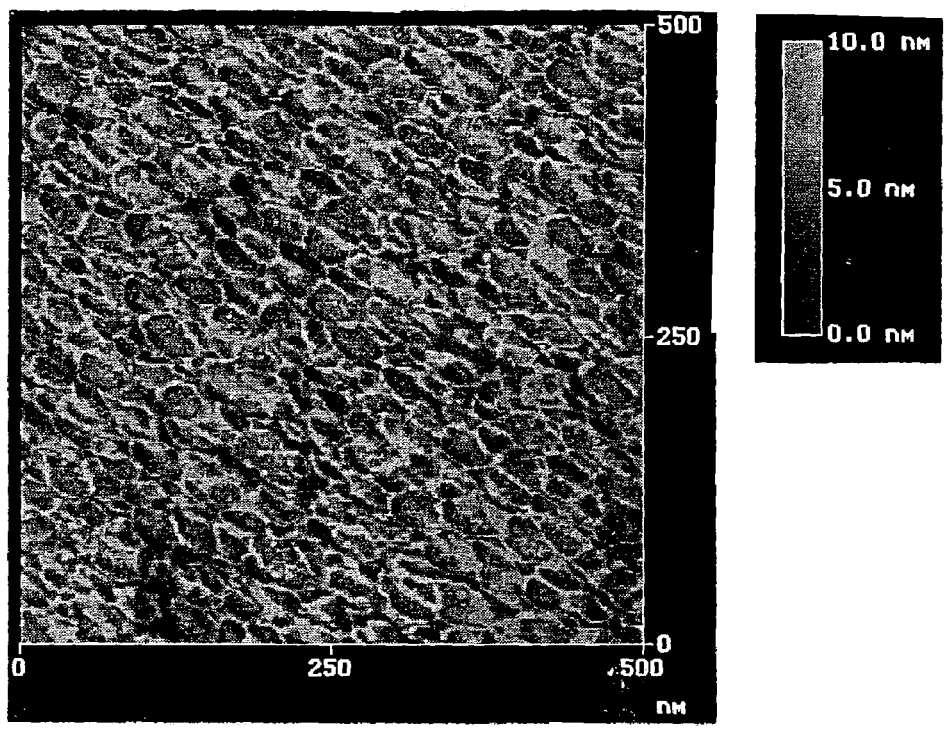
FIG. 3 is an AFM photography of a magnetic disk surface without lubricant, using the probe of preferred embodiment 1.
Figure 3B:
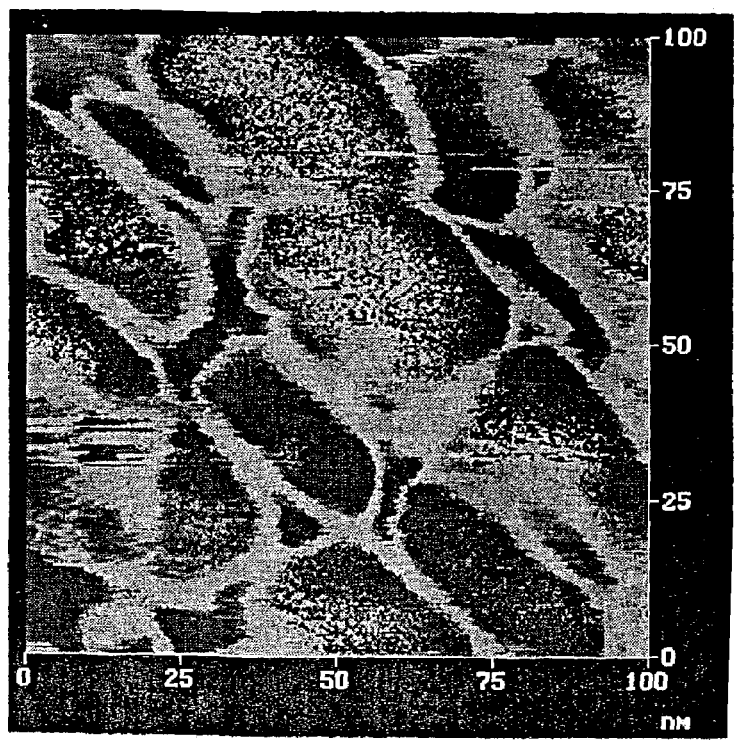
Figure 4A:
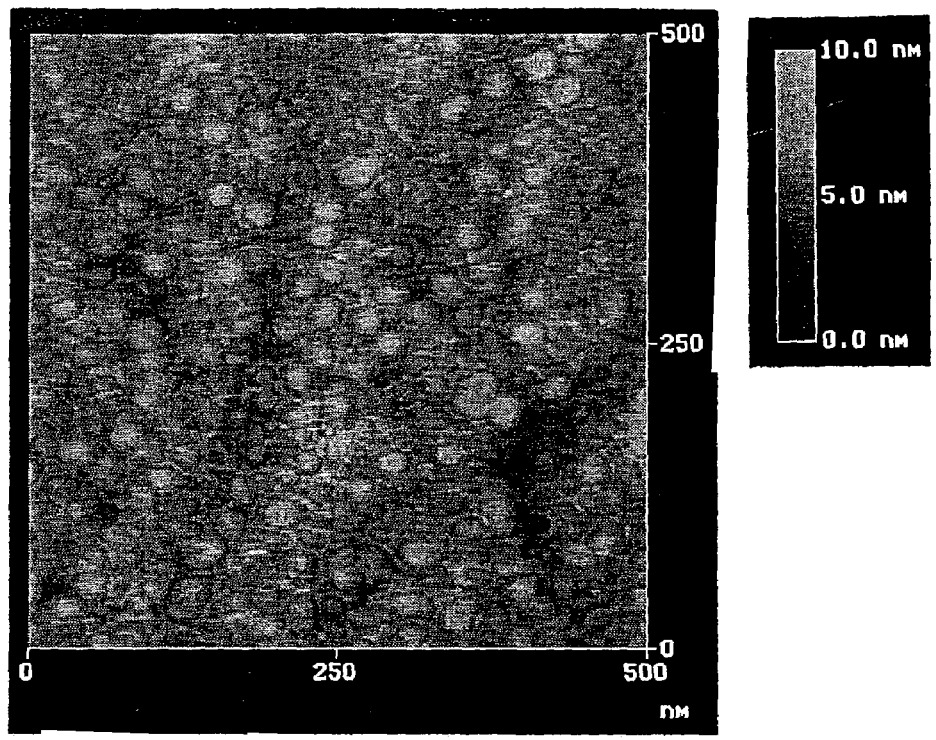
FIG. 4 is an AFM photography of a magnetic disk surface with lubricant, using the probe of preferred embodiment 1.
Figure 4B:
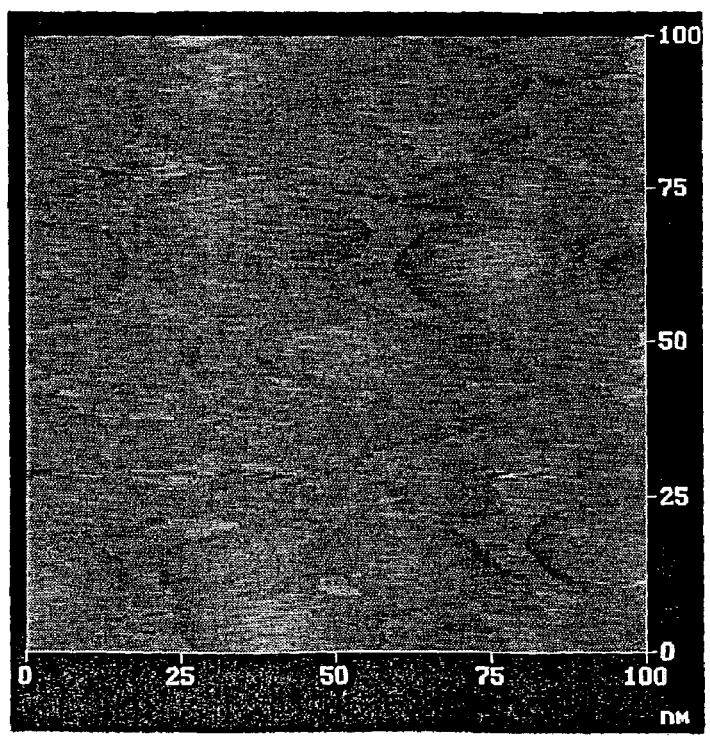

Now reference to FIGS. 3 and 4, the resulting measurements using the probe of preferred embodiment 1 are shown. FIG. 3 indicates the result of the measurement of the magnetic disk without lubricant applied, while FIG. 4 indicates that of the magnetic disk with lubricant applied. FIG. 3(a), 3(b), FIGS. 4(a), and 4(b) show the same surface area and the same height scale as the FIGS. 2(a), 2(b).

Now referring to FIG. 3, which shows the resulting measurements of the magnetic disk without lubricant applied, in particular to FIG. 3(b), it is clearly indicated that round and darker area is surrounded by brighter filament like area. Since brighter area is the area higher than darker one, it can be seen that something is adhered around the round spot like a wall. This fouling is assumed to be surface pollutant, and the darker round area is assumed the surface salient of carbon protective film.

Now referring to FIG. 4, which shows the resulting measurements of the magnetic disk with lubricant applied, in particular to FIG. 4(b), it can be seen that there are less difference of height since the contrast in this case is less than the case of surface pollutant, however something in the form of ribbon around the round spots can be seen. The ribbon like area may be assumed to be lubricant, and the round area is assumed to be the surface salient of the carbon protective film.

Figure 5:
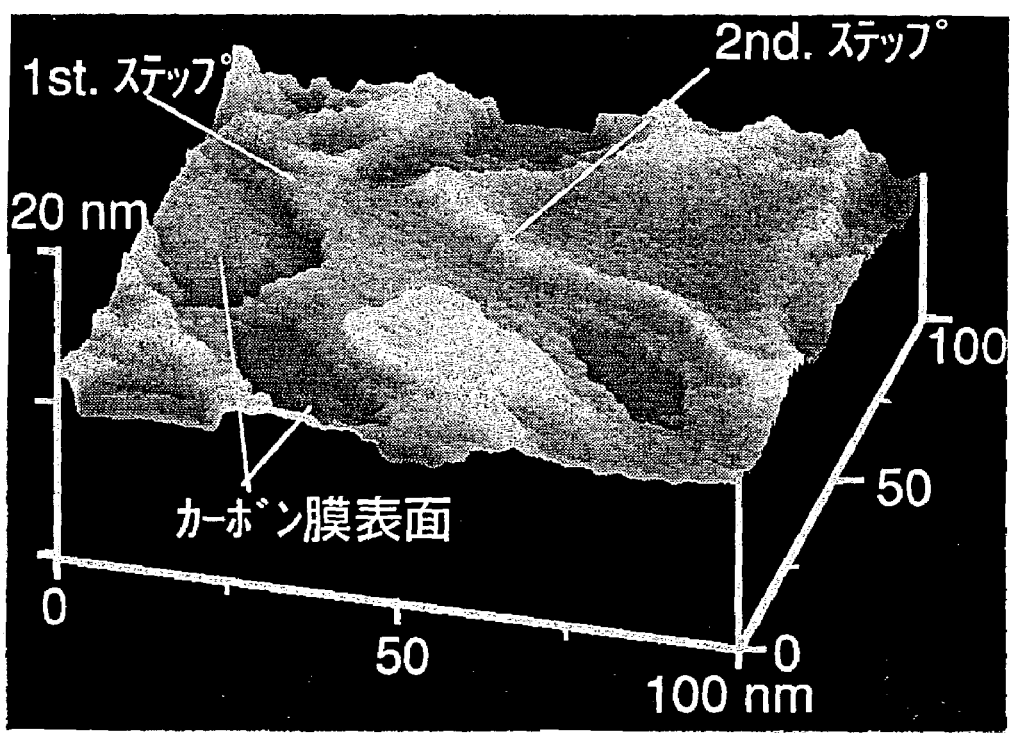
FIG. 5 is an AFM photography of lubricant on a magnetic disk surface, using the probe in accordance with the present invention.

Now referring to FIG. 5, which shows the enlarged perspective view of the magnetic disk surface with lubricant applied. The present invention may clearly identify that the lubricant surface also has some structure in the step form.

It has been the first time to clearly identify the configuration of adhered surface pollutant or lubricant, and the surface structure of the liquid lubricant at the level of few nanometers.

After making contact of the probes of the embodiment 1 and comparative example 5 with the magnetic disk surface having lubricant applied, the force affecting to the probes when separating from the disk surface was measured as a force curve to determine based on the maximum value measured the adsorption force at the time of separating the probe from the surface. In case of the embodiment 1, the adsorption force was determined to be one tenth (1/10) of the control. In case of the comparative example 5, the adsorption force was relatively higher because lubricant was disposed at the probe tip. In contrast, in case of the embodiment 1, it is appreciated that the adsorption force was significantly decreased because the fluorinated coating was preventing the lubricant from disposing on the probe tip.

Figure 6:
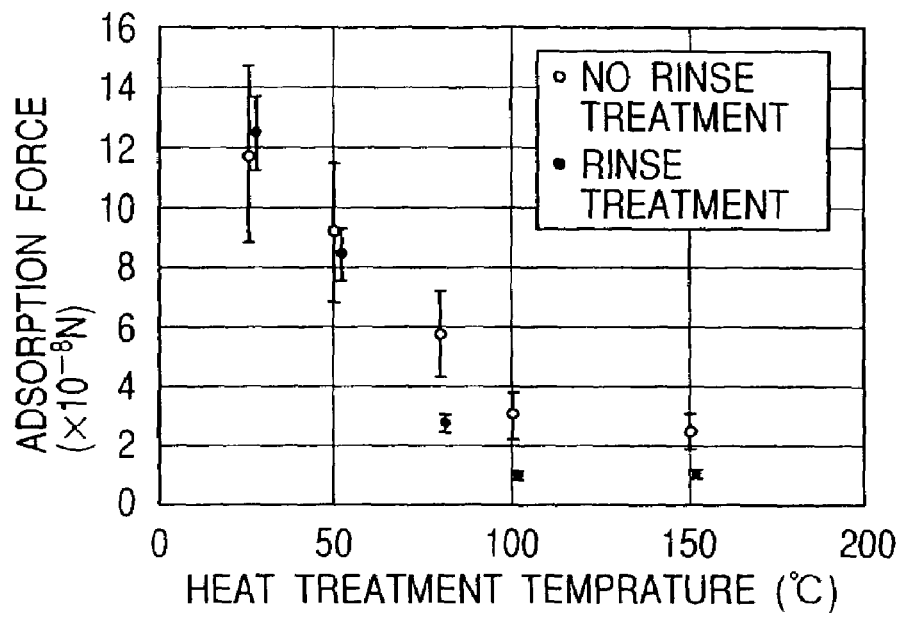
FIG. 6 is a schematic diagram showing the relationships between the temperature of heat treatment and the adsorption force.
Figure 7:
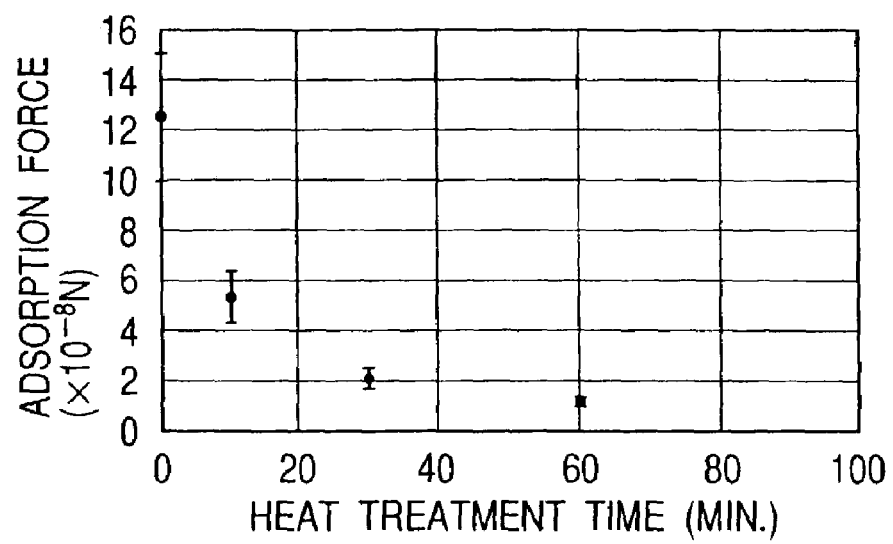
FIG. 7 is a schematic diagram showing the relationships between the time of heat treatment and the adsorption force.

The resulting measurements of said adsorption force in case of the embodiments and controls shown in the table 1 above are shown in FIGS. 6 and 7. FIG. 6 shows the relationships between the heat treatment temperature and the adsorption force. The duration of heat process was sixty (60) minutes. The controls 5 and 7 were 25 degrees Celsius of heat process temperature. It can be seen that by using a probe with fluoride coating thereon, the adsorption force decreases and that this condition is preferable, in particular for the cases of heat process temperature higher than or equal to 100 degree Celsius. It should be noted here that preferably the heat process temperature should be lower than or equal to 400 degrees Celsius in order to prevent heat degradation of coating film. By rinsing at or over the heat process temperature of 100 degrees Celsius the adsorption force will become less than or equal to 20 nN. When the absorbability is less than or equal to 20 nN, the phase angle against water will be 140 degrees or over.

Now referring to FIG. 7, there is shown the relationship between the heat treatment time and the adsorption force. The temperature of heat process here is 150 degrees Celsius. It can readily be appreciated that in order to achieve the adsorption force less than or equal to 20 nN, duration of thirty (30) minutes or more of heat treatment may be required.

Figure 8:
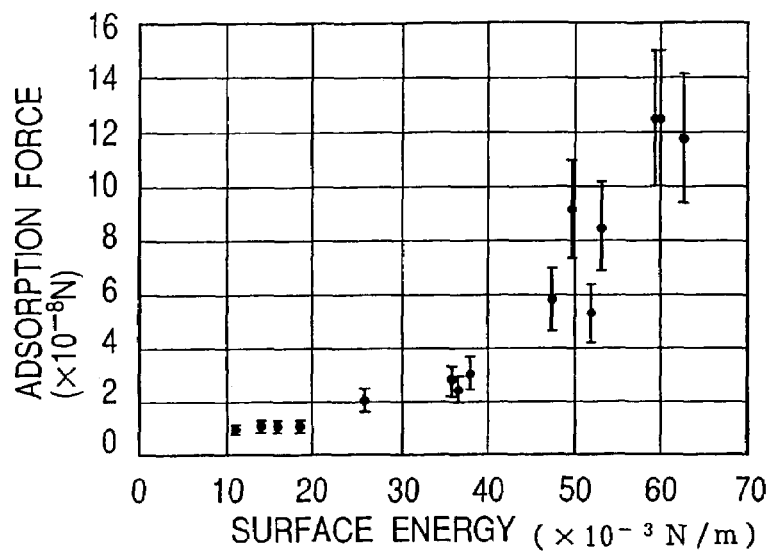
FIG. 8 is a schematic diagram showing the relationships between the surface energy and the adsorption force.

On the other hand, The correlation of said adsorption force against the surface energy is shown in FIG. 8, in which for the fluoride coating film formed on the silicon wafer as have been described above, the resulting measurements of surface energy by the AFM is treated as the surface energy in such coating condition. In accordance with this figure, it can be seen that there exists correlation between the surface energy and the adsorption force. Preferably the surface energy is approximately less than or equal to $20 \times 10^{-3}$ N/m. In order to achieve a probe with the adsorption force less than or equal to 20 nN, the surface energy should be less than or equal to $20 \times 10^{-3}$ N/m and more than or equal to $0 \times 0^{-3}$ N/m.

Figure 10:
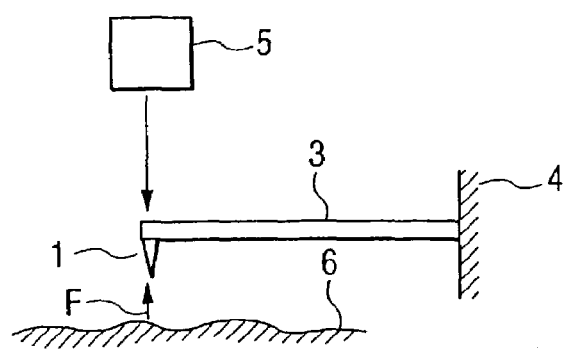
FIG. 10 is a schematic diagram of the AFM of a preferred embodiments in accordance with the present invention.

Now referring to FIG. 10, there is shown a schematic diagram of the AFM of one of preferred embodiments in accordance with the present invention. The probe 1 which may oppose to the specimen 6 being measured at very fine clearance may be any one of the preferred embodiments above. The beam of cantilever 3 supports the probe 1 at one end, and the cantilever itself is supported by a support 4 at the other end. The photo-interferometer, photoshifter and the like may be used for the displacement detector 5 for detecting the displacement of the probe 1.

Some examples of measurement of cover rate of lubricant by using this AFM will be described below. The magnetic disks were produced as described above. The average film thickness was 0.9 nm and 1.8 nm as described above. When rinsing the magnetic disk having average film thickness of 0.9 nm with the solvent used for the lubricant application, a magnetic disk having the average lubricant film thickness of 0.4 nm was obtained.

The ratio of the surface area of lubricant covering the surface of carbon protective film to the measured surface area was measured by using the AFM in accordance with the preferred embodiment 7. The cover ratio was 100% for the average film thickness of lubricant of 1.8 nm, 43% for 0.9 nm, and 13% for 0.4 nm. The time required for this measurement was five (5) minutes per specimen.

A friction wearing test called "contact start-stop (CSS) test" was performed using such magnetic disks. The characteristics of the magnetic recording heads used for this test were the load 30 mN, and the length of head 1.2 mm, and the heads with carbon protective film formed on the head slider side were used. The magnetic recording head floating distance was 40 nm, the revolution per minute of the magnetic disks was 7200 min$^{-1}$.

When comparing the friction force at the 30000th paths of CSS test, the friction force was 21 mN for the magnetic disk with cover rate 100%, 23 mN for the magnetic disk with cover rate 43%, and 58 mN for the magnetic disk with cover rate 13%. Based on this result the friction can be estimated to be larger when the cover rate becomes extremely lower. Preferably the cover rate of the lubricant is in the range from 43 to 100%, most preferably in the range from 55 to 100%.

Based on such data, among magnetic disks produced as described above, ones were selected which had the lubricant cover rate in such range as described immediately above. More reliable magnetic disks were obtained in this way.

The atomic force microscopy in accordance with the present invention allows the measurement of the surface configuration of soft fouling adhered onto a body surface, such as the surface configuration of soft fouling, the liquid thin film on a solid surface, and the like. By using the atomic force microscopy in accordance with the present invention the measurement of the surface configuration of soft fouling such as lubricant on a magnetic disk has been obtained. In addition, the atomic force microscope in accordance with the present invention allows providing a method for producing magnetic disks comprising the measurement process of the surface configuration of lubricant film adhered on the surface of the magnetic disk.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. it is intended that the scope of the invention be defined by the claims appended hereto, and their equivalents.

What is claimed is:

1. A method of measuring a lubricant film disposed on a surface of a magnetic recording medium by using an atomic force microscopy, comprising:
   measuring an area of a portion covered by the lubricant film on the surface of the magnetic recording medium and an area of a portion of a protective film exposed on the surface of the magnetic recording not covered by the lubricant film, using the atomic force microscopy provided with a probe formed by a fluoride coating film including fluoroalkyl groups; and
   determining a surface cover rate of the lubricant film on the magnetic recording medium, based on the result of the measuring step.

2. A method according to claim 1, wherein the surface energy of a tip of the probe is less than or equal to $20 \times 10^{-3}$ N/m.

3. A method according to claim 1, wherein the fluoride coating of a tip of the probe is made by heat treatment in a range of temperature from 100 degrees Celsius to 400 degrees Celsius.

4. A method of producing a magnetic recording medium, comprising:
   forming a protective film on the magnetic recording medium;
   forming a lubricant film on the protective film; and
   measuring a surface cover rate of the lubricant film on the magnetic recording film,
   wherein measuring of the surface cover rate includes a first step of measuring an area of a portion covered by the lubricant film on the surface of the magnetic recording medium and an area of a portion of the protective film exposed on the surface of the magnetic recording without being covered by the lubricant film, using the atomic force microscopy provided with a probe formed by a fluoride coating film including fluoroalkyl groups, and a second step of determining the surface cover rate of the lubricant film on the magnetic recording medium, based on the result of the first step.

5. A method according to claim 4, wherein the surface energy of a tip of the probe is less than or equal to 20×10−3 N/m.

6. A method according to claim 4, wherein the fluoride coating of a tip of the probe is made by heat treatment in a range of temperature from 100 degrees Celsius to 400 degrees Celsius.

7. A method of producing a magnetic recording medium by forming on a substrate at least a magnetic film, and forming on said magnetic film a lubricant film comprised of liquid lubricant either directly or through a protective film, comprising:

approaching the probe of an atomic force microscope to the lubricant film surface being measured;

measuring the atomic force generated between said surface of lubricant film being measured and said probe;

determining a configuration of said surface of the lubricant film being measured; and selecting among said magnetic recording medium ones with the surface cover rate of said lubricant film determined based on said configuration being in a desired range;

wherein the atomic force microscope has a cantilever provided with a probe at one end, the other end of said cantilever being supported by a support, and a displacement detector for detecting a displacement of said probe using an atomic force affecting between said probe and said surface being measured, wherein a tip of said probe is made so as to have a surface energy of the tip of said probe less than an interface energy between the tip of said probe and said surface being measured.

8. The new method of producing a magnetic recording medium according to claim 7, wherein the surface energy of a tip of the probe is less than or equal to $20 \times 10^{-3}$ N/m.

9. The method of producing a magnetic recording medium according to claim 8, wherein the desired range of the surface cover rate is 55% to 100%.

10. A method of producing a magnetic recording medium by forming on a substrate at least a magnetic film, and forming on said magnetic film a lubricant film comprised of liquid lubricant either directly or through a protective film, comprising:

approaching the probe of an atomic force microscope to a lubricant film surface being measured;

measuring the atomic force generated between said surface of lubricant film being measured and said probe;

determining a configuration of said surface of the lubricant film being measured, and selecting among said magnetic recording medium ones with the surface cover rate of said lubricant film determined based on said configuration being in a desired range;

wherein the atomic force microscope has a cantilever provided with the probe at one end, the other end of said cantilever being supported by a support, and a displacement detector for detecting a displacement of said probe using an atomic force affecting between said probe and said surface being measured, wherein a tip of said probe is coated with a fluoride coating film including fluoroalkyl groups insoluble to a solvent.

11. The method of producing a magnetic recording medium according to claim 10, wherein the surface energy of a tip of the probe is less than or equal to $20 \times 10^{-3}$ N/m.

12. A method of producing a magnetic recording medium by forming on a substrate at least a magnetic film, and forming on said magnetic film a lubricant film comprised of liquid lubricant either directly or through a protective film, comprising:

approaching the probe of an atomic force microscope at very fine clearance to a lubricant film surface being measured;

measuring the atomic force generated between said surface of lubricant film being measured and said probe;

determining a configuration of said surface of the lubricant film being measured; and selecting among said magnetic recording medium ones with the surface cover rate by of said lubricant film determined based on said configuration being in a desired range, wherein the atomic force microscope has a cantilever provided with the probe at one end, the other end of said cantilever being supported by a support, and a displacement detector for detecting a displacement of said probe using an atomic force affecting between said probe and said surface being measured, wherein a surface energy of a tip of said probe is less than or equal to $20 \times 10^{-3}$ N/m.

13. The method of producing a magnetic recording medium according to claim 12, wherein the desired range of the surface cover rate is 55% to 100%.

* * * * *